(12) United States Patent
Benson et al.

(10) Patent No.: US 7,143,645 B2
(45) Date of Patent: Dec. 5, 2006

(54) METER HOUSING ASSEMBLY AND METHOD OF ASSEMBLY

(75) Inventors: Ronald D. Benson, Colgate, WI (US); Eric Metzger, Milwaukee, WI (US); Lee Karsten, Fox Point, WI (US); H. Paul Walding, Jr., Slinger, WI (US)

(73) Assignee: Badger Meter, Inc., Milwaukee, WI (US)

( * ) Notice: Subject to any disclaimer, the term of this patent is extended or adjusted under 35 U.S.C. 154(b) by 124 days.

(21) Appl. No.: 10/831,990

(22) Filed: Apr. 26, 2004

(65) Prior Publication Data

US 2005/0235747 A1 Oct. 27, 2005

(51) Int. Cl.
*G01F 3/32* (2006.01)
*G01F 15/14* (2006.01)

(52) U.S. Cl. .............................. 73/238; 73/237; 73/273
(58) Field of Classification Search ................. 73/238, 73/244, 237, 236, 273
See application file for complete search history.

(56) References Cited

U.S. PATENT DOCUMENTS

| | | | | | |
|---|---|---|---|---|---|
| 1,880,223 | A | * | 10/1932 | Weymouth et al. | 73/258 |
| 2,196,425 | A | * | 4/1940 | Nuebling | 137/513 |
| 3,289,476 | A | * | 12/1966 | Brette | 73/258 |
| 3,696,932 | A | * | 10/1972 | Rosenberg | 210/437 |
| 3,802,266 | A | * | 4/1974 | Rittenhouse et al. | 73/273 |
| 3,990,299 | A | * | 11/1976 | Coffman | 73/199 |
| 5,085,076 | A | * | 2/1992 | Engelmann | 73/197 |
| 5,227,048 | A | * | 7/1993 | Seibel et al. | 210/94 |
| 5,251,149 | A | * | 10/1993 | Williams et al. | 702/46 |
| 5,251,480 | A | * | 10/1993 | Brunson et al. | 73/253 |
| 5,261,275 | A | * | 11/1993 | Davis | 73/258 |
| 5,333,496 | A | * | 8/1994 | Fenelon | 73/202 |
| 5,546,801 | A | * | 8/1996 | Swinson et al. | 73/273 |
| 5,824,896 | A | * | 10/1998 | Lee | 73/238 |
| 6,178,816 | B1 | * | 1/2001 | Katzman et al. | 73/201 |
| 6,383,643 | B1 | | 5/2002 | De Jarlais | |
| 6,494,674 | B1 | * | 12/2002 | Cameron | 415/124.2 |
| 6,581,458 | B1 | * | 6/2003 | Hathaway et al. | 73/238 |
| 6,612,188 | B1 | * | 9/2003 | Hamilton | 73/861.78 |
| 6,817,379 | B1 | * | 11/2004 | Perla | 137/801 |
| 6,848,303 | B1 | * | 2/2005 | Oeder et al. | 73/273 |
| 2002/0083778 | A1 | * | 7/2002 | Hamilton | 73/861.78 |

* cited by examiner

Primary Examiner—Harshad Patel
(74) Attorney, Agent, or Firm—Quarles & Brady LLP

(57) ABSTRACT

A water meter housing assembly (10) comprises a cylindrical, plastic housing body (11), a non-cast housing bottom (13) of hydroformable or stamped brass, a single-piece strainer and sealing member (40) that is disposed in the housing bottom (13) and portions of non-cast hydroformable or stamped brass tubing (15) with spud ends (16, 17) for connection in a water supply line. The brass consists essentially of lead-free material. The assembly (10) is designed to provide a lower cost alternative to foundry cast meter housings. The assembly (10) also provides advantages in a method of vertical assembly that saves manufacturing cost.

13 Claims, 4 Drawing Sheets

METER HOUSING ASSEMBLY AND METHOD OF ASSEMBLY

TECHNICAL FIELD

This invention relates to fluid meters and in particular to improvements in meters for measuring the flow of water in residential and industrial utility applications.

DESCRIPTION OF THE BACKGROUND ART

Water meter housings have traditionally been made of brass or bronze alloys, either cast or wrought. Such housings have a cylindrical body with a threaded inlet port coupling and a threaded outlet port coupling for connecting the housing in a water supply line. A bottom cover may close an access opening to the body cavity, and is often made of the same metal as the main housing part. The metering element is disposed in the housing in the flow stream to provide metering movements in response to flow. These movements drive a magnet. A meter register is mounted on top of the housing and pickup the revolutions of the magnet and includes a numerical display to indicate the volumetric usage by a utility customer.

The castings for the water meter housings are made in a foundry and are a relatively expensive component of the overall meter assembly. There is a constant demand in the marketplace for a reduction in the costs of metering units, which are also needed in high volumes.

In addition, materials used for such castings have included lead.

It would therefore be desirable in many applications to find an alternative to the traditional cast meter housing to reduce the cost of manufacture. Another goal is to provide an alternative material that is substantially lead-free.

Another way of reducing manufacturing cost would be to reduce the number of parts and make the parts easier to manufacture.

Another way would be to design the components for easier assembly.

The present invention was made in response to these needs.

SUMMARY OF THE INVENTION

The invention provides a water meter housing assembly that replaces the traditional brass casting for a water meter housing. The invention provides a non-cast housing body and a non-cast metal housing bottom which can be assembled to the housing body, and portions of non-cast metal tubing which can be assembled to the housing bottom and to the supply line to provide a non-leaking housing assembly of reasonable durability for water meter applications.

In a preferred embodiment, the metal used for the housing bottom and the tubing consists essentially of lead-free material.

The invention also provides a single-piece strainer and sealing member for separating the inlet flow and outlet flow of the metering chamber, for sealing the outlet and for providing a screen for blocking debris in the inlet flow.

The invention provides a metering assembly that can be vertically aligned and assembled which reduces manufacturing costs in comparison with prior art methods.

The invention can be used with a lower cost of manufacture metering element that is disclosed in a co-pending application of the present assignee filed on even date herewith and entitled "Disc Meter for Resisting Rotational Forces," the disclosure of which is hereby incorporated by reference.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
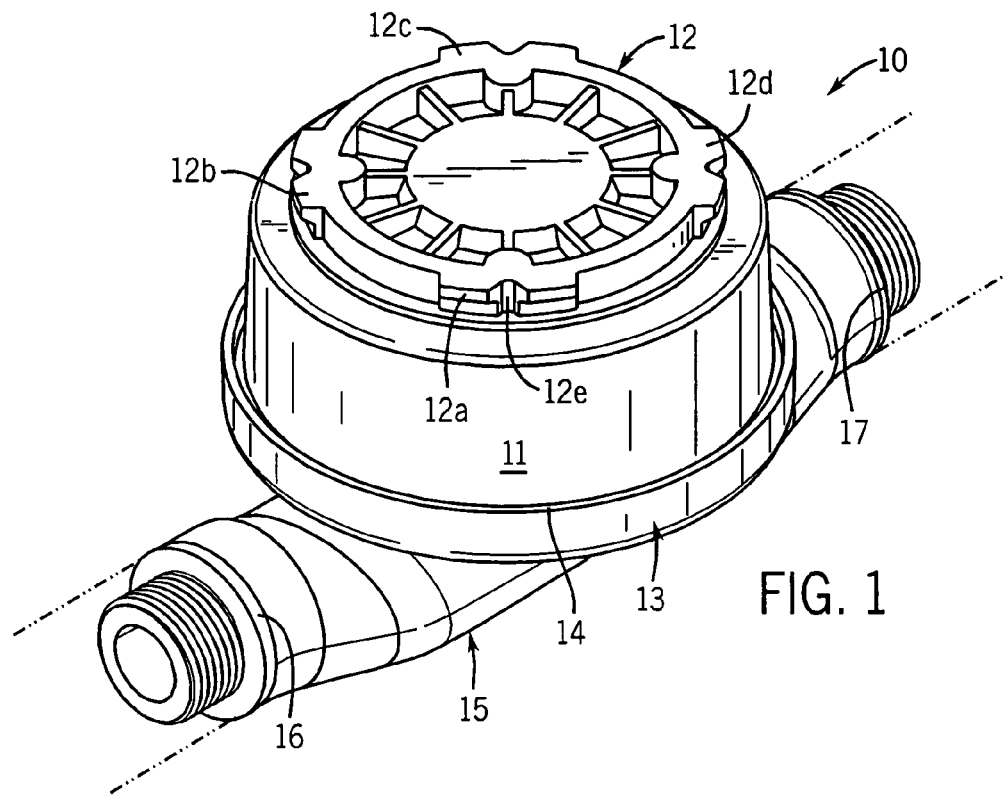
FIG. 1 is a perspective view of a meter housing assembly that incorporates the present invention.
Figure 2:
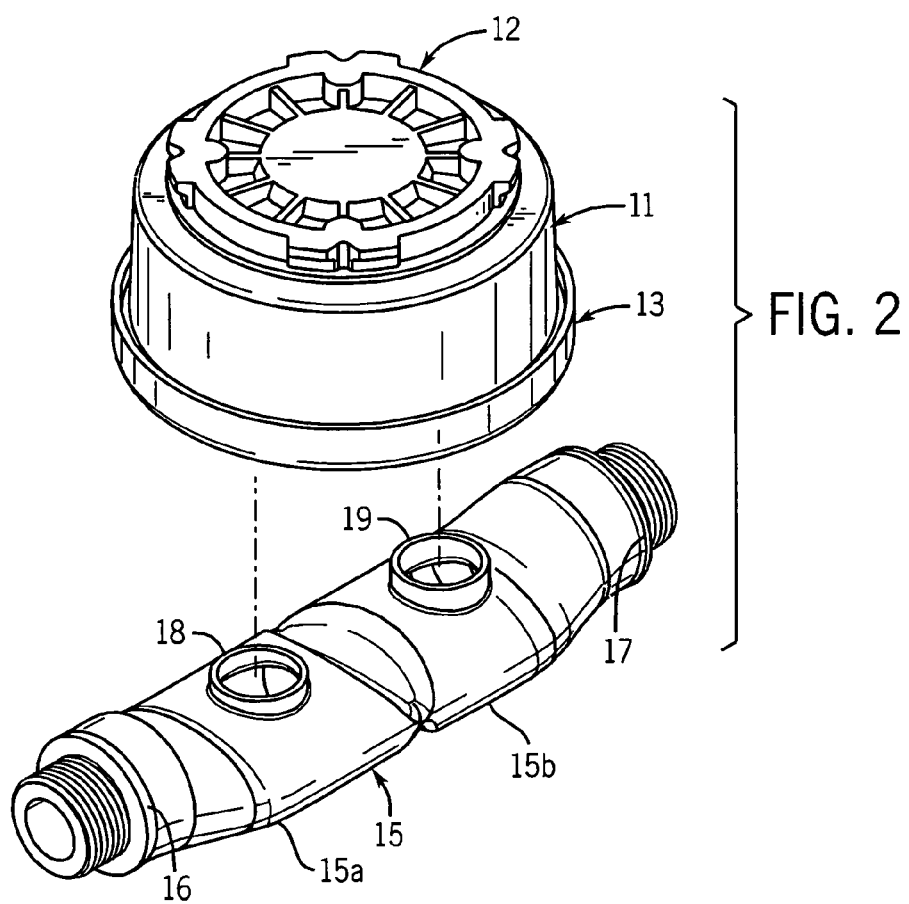
FIG. 2 is a partly exploded perspective view of the assembly of FIG. 1.

Referring to FIG. 1, a meter housing assembly 10 of the present invention has three main components. The first component is an integrally formed, cylindrical, plastic housing body 11 with a molded, patterned embossment 12 for connecting to a meter register (not shown). The embossment 12 includes four lugs 12a, 12b, 12c and 12d, which are spaced ninety degrees apart around a ring, each lug forming a V-shaped slot 12e, each slot 12e receiving a screw (not shown) to allow securing of a meter register (not shown) on top of the plastic body 11.

The plastic housing body 11 is received in a second main component, which is a hydroformed or stamped brass housing bottom 13. The housing bottom can be made of copper or a copper alloy provided that it is essentially lead-free. The housing bottom 13 has a lip 14 that runs around a lower edge of the plastic body 11. The bottom is held in place by a stamped and formed clamp (not shown) or by rolling the lip 14 over the bottom ridge 11a of the plastic housing body 11.

Figure 4:
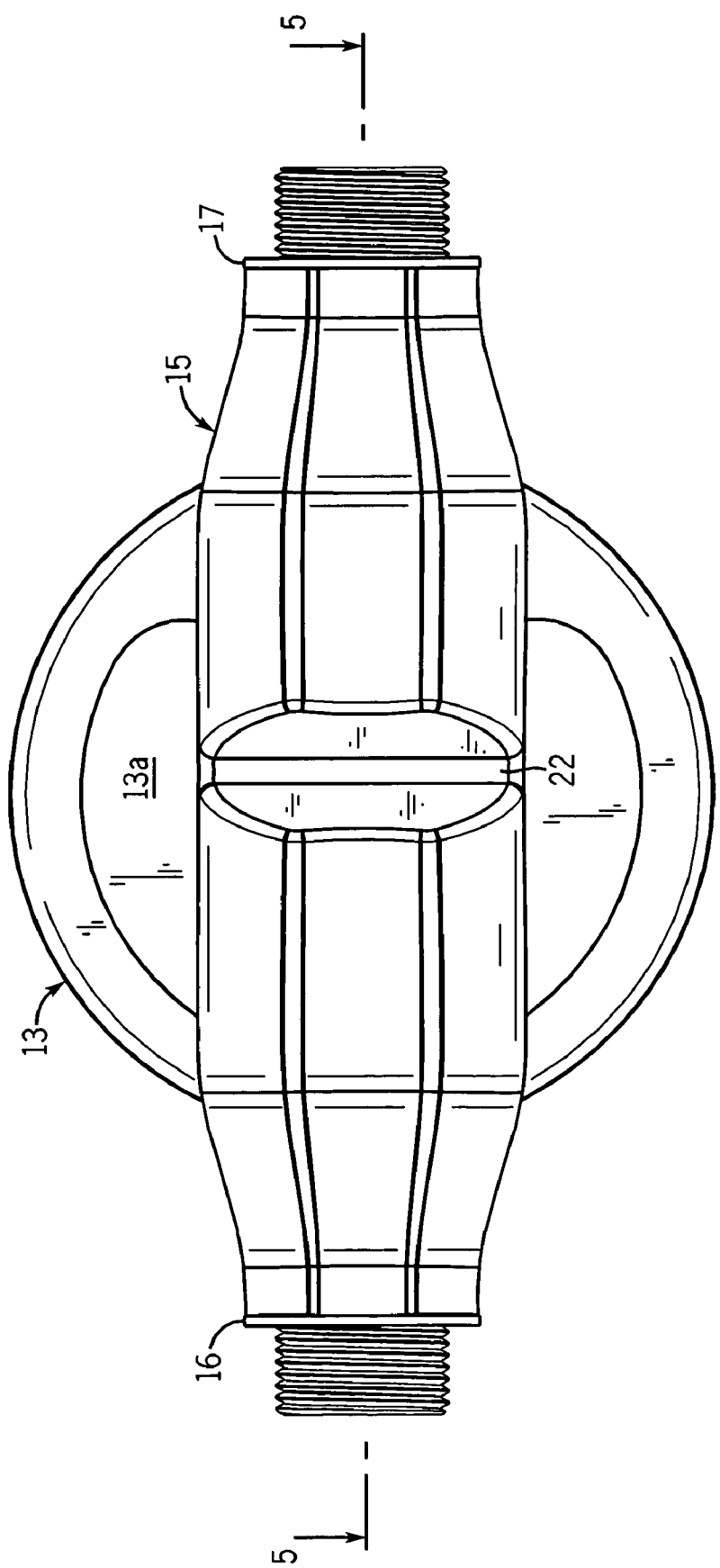
FIG. 4 is a bottom plan view of the assembly of FIG. 1.
Figure 5:
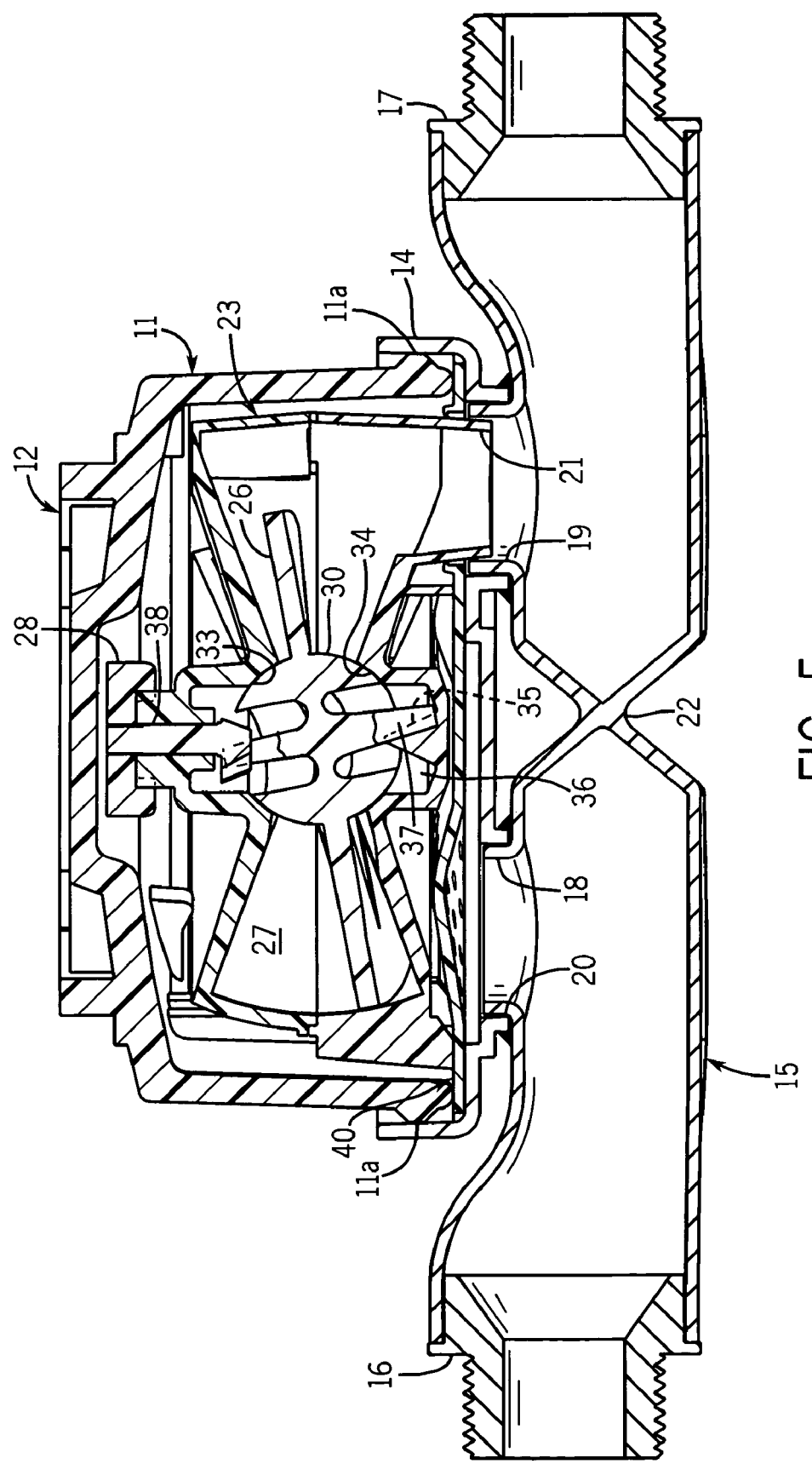
FIG. 5 is a sectional view taken in the plane indicated by line 5—5 in FIG. 4.

The third main component is provided by portions 15a, 15b of hydroformable or stamped brass tubing 15. The tubing can be made of copper or a copper alloy provided that it is essentially lead-free. The brass tubing 15 is also formed with an inlet exit 18 and an outlet entry 19 for reception in an inlet spout 20 and outlet spout 21 of the housing bottom 13, which open downward seen in FIGS. 3 and 5. The brass tubing 15 also has a joint 22 along its length which serves as a partition to separate the inlet flow from the outlet flow as seen in FIGS. 4 and 5. In an alternative, the portions of brass tubing 15 for the inlet and outlet could be two portions separated by an air space replacing joint 22.

Two additional components are provided by a pair of threaded spud ends 16 and 17. The spud ends 16, 17 provide a threaded inlet and a threaded outlet for connection in a water supply line (not shown). The spud ends 16, 17 are brazed on, welded to, or crimped on, the ends of the tubing 15 to provide sealed watertight connections.

Figure 3:
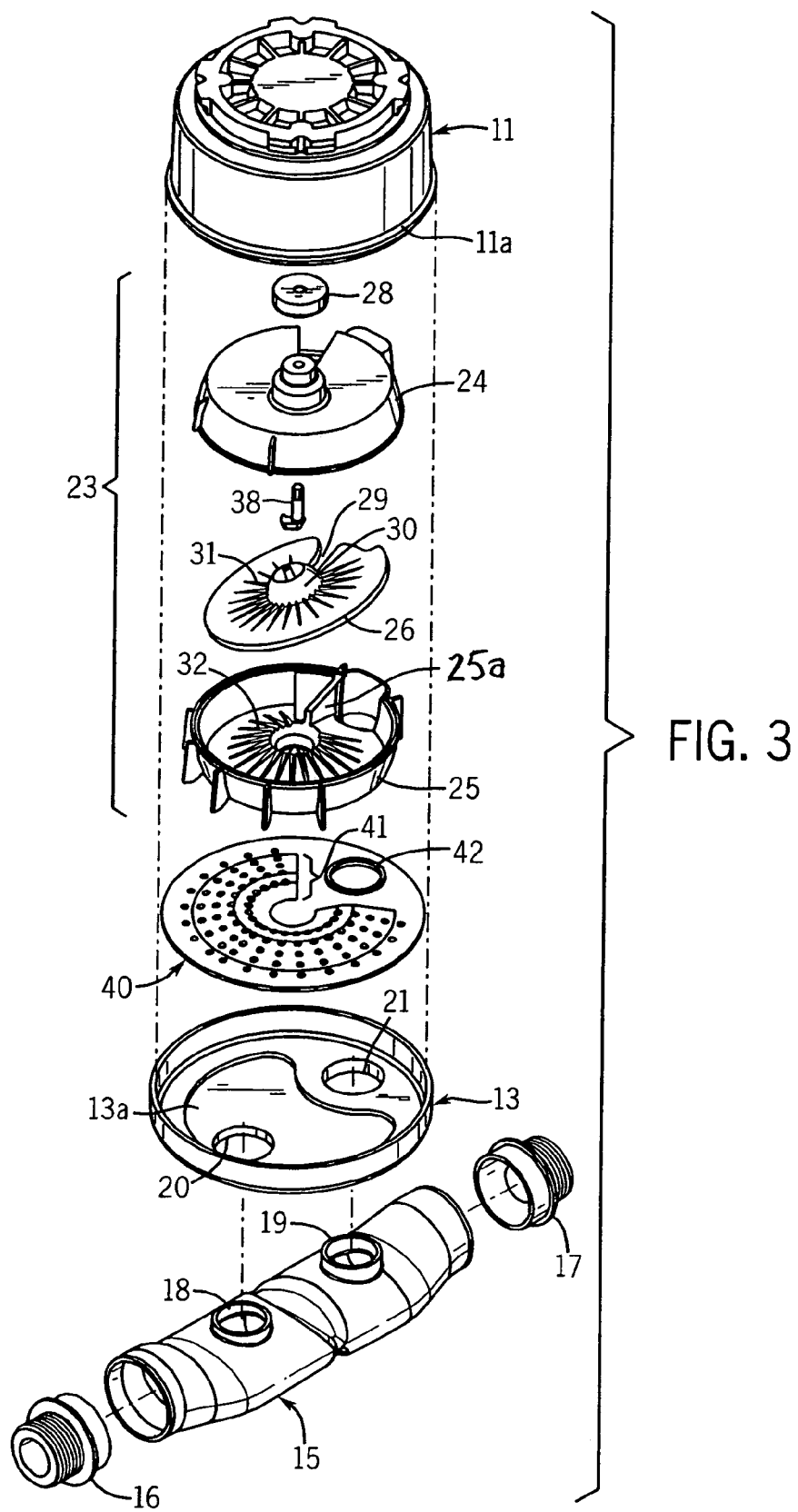
FIG. 3 is fully exploded perspective view of the assembly of FIG. 1.

As seen in FIGS. 3 and 5, the meter housing 11 encloses a disc metering assembly 23. This metering assembly has upper and lower casing parts 24, 25, which are assembled to provide a metering chamber 27 in which a disc 26 provides a nutating action that is translated to revolutions of a magnetic element 28. The revolutions of the magnetic element 28 are detected by a magnetic detector in the meter register (not shown) and are converted to electrical signals or further mechanical movements for operating register wheels.

As seen in FIGS. 3 and 5, the disc 26 has a radial slot 29 that straddles a partition 25a in the casing parts 24, 25 for separating the inlet and outlet flows. The disc 26 is prevented from rotating by ridges 31 on the disc 26 which engage grooves 32 on the inside of the casing parts 24, 25. As seen in FIG. 3, the ridges on the bottom of the disc (not shown, but similar to ridges 31 on the top of the disc 26) would engage the grooves 32 on the lower disc meter casing part 25 as disc 26 wobbles and nutates. The disc 26 has a spherical hub portion 30 also seen in FIG. 6, which is received in concave bearings 33, 34 formed in the upper and lower casing parts 24, 25.

Referring to FIGS. 3 and 5, the lower casing part 13 forms a control cone 35 (FIG. 5) on an interior bottom with an annular groove 36 around the control cone 35, and the spherical portion 30 of the disc 26 has an integrally formed spindle 37. The spindle 37 extends from a spherical portion 30 to the lower end contacting the control cone 33 and traveling around in the groove 36 around the control cone 35, and to an upper end traveling in a circle to rotate the magnetic element 28. An inverted T-shaped crossbar unit 38 couples rotations of the upper end of the spindle 37 to rotations of the magnetic element 28.

Referring again to FIG. 5, as fluid is admitted into the metering chamber 27, it flows underneath a first portion of the disc 26 and tends to lift the disc 26. This lifting action travels around in a circle and when it reaches the other side of the chamber 27, the first portion of the disc 26 will tilt downward. This produces the well known nutating movement or wobble action as fluid passes through the chamber 27.

A further description of the disc metering assembly will be found in the co-pending application of the present assignee filed on even date herewith and entitled "Disc Meter for Resisting Rotational Forces," the disclosure of which is hereby incorporated by reference. The meter housing assembly disclosed herein can also be used to house metering mechanisms other than the nutating disc type described herein.

Both a disc metering assembly 23 which eliminates the thrust roller of the prior art, and the meter housing assembly 10 described herein provide lower cost alternatives to utility customers than have heretofore been offered by meters using cast meter housings and other types of metering elements.

An additional enhancement is provided by the single-piece strainer and sealing member 40 which is a generally planar, disc-shaped member that is disposed in a bottom of the housing member 13 over the inlet 20 and the outlet 21. The sealing member 40 has an arcuate array of holes 41 forming a filtering screen across the inlet 20 for blocking debris in the inlet flow. The housing bottom 13 forms a depression 13a in the area of the array of holes 41 to expand the cross section of the inlet 20 in the screening area. The sealing member 40 has a round aperture 42 for positioning over the outlet port 21 on the housing bottom 13. The sealing member 40 can be made of natural or synthetic rubber to provide a seal between the inlet flow through the inlet 20 and outlet flow through the outlet 21. The member 40 also provides a filtering element 41 for the inlet flow.

This single piece 40 replaces three parts used in an assembly of the prior art, namely: an inlet strainer, an outlet seal and a cover gasket.

FIG. 3 also illustrates that the assembly of the present invention can be assembled in along a single, substantially vertical axis (corresponding to a central axis through the plastic housing body 11 and the disc metering assembly 23) by stacking or vertically assembling components including the housing bottom 13, the sealing member 40, the disc meter assembly 23, and the plastic meter housing 11. These can all be stacked, or picked and placed, to provide a lower cost of assembly than for constructions of the prior art.

This has been a description of the preferred embodiments, but it will be apparent to those with skill in the art to which the invention pertains that various modifications may be made to these specific embodiments without departing from the spirit of the present invention, and that such modifications are intended to be encompassed by the following claims.

We claim:

1. A water meter housing assembly, comprising:
  a cylindrical housing body formed at least in part of plastic;
  a non-cast metal housing bottom in which the housing body is received;
  wherein the housing bottom has an inlet and an outlet opening downward through said housing bottom; and
  portions of non-cast metal tubing having an inlet port and an outlet port for connection to the inlet and outlet, respectively, of the housing bottom; and
  wherein the metal tubing also has a supply inlet and a supply inlet for connection in a water supply line, the portions of tubing having a transverse partition located along the length thereof to separate an inlet flow from an outlet flow; and
  wherein the metal in the metal housing bottom and the portions of tubing consists essentially of a lead-free material.

2. The water meter housing assembly of claim 1, wherein the tubing is made of hydroformed or stamped copper alloy.

3. The water meter housing assembly of claim 2, wherein the housing bottom is also made of hydroformed or stamped copper alloy.

4. The water meter housing assembly of claim 1, further comprising a single-piece sealing member that is disposed in a bottom of the housing bottom across the inlet and the outlet, said single-piece member forming a screen across the inlet for blocking debris in the inlet flow and said sealing member separating the inlet flow from the outlet flow near the inlet to the housing bottom.

5. The water meter housing assembly of claim 4, wherein the sealing member is made of synthetic rubber.

6. The water meter housing assembly of claim 4, in combination with a disc metering element, wherein the plastic body, the metering element, the housing bottom, the sealing member and the length of tubing can be vertically assembled.

7. The water meter housing assembly of claim 1, wherein the housing body is an integrally formed plastic body which together with the metal housing bottom forms a cavity for receiving a disc metering assembly; and wherein a disc metering element without a thrust roller is disposed in said cavity.

8. The water meter housing assembly of claim 1, further comprising threaded fittings for assembly to opposite ends of the tubing to facilitate connection to a water supply line.

9. The water meter housing assembly of claim 1, wherein the housing bottom has a lip that runs around a lower edge of the housing body.

10. A method of assembling a water meter assembly having a plurality of components comprising;
   a cylindrical housing body formed at least in part of plastic,
   a non-cast metal housing bottom in which the housing body is received;
   portions of non-cast tubing having an inlet and an outlet for connection to an inlet port and an outlet port, respectively, of the housing bottom; and
   wherein the metal tubing also has a supply inlet and a supply outlet for connection in a water supply line, the portions of tubing having a transverse partition located along a length of the tubing to separate the inlet flow from the outlet flow; and
   wherein the method comprises assembling the plurality of components along a substantially vertical axis corresponding to a central axis through the housing body.

11. The method of claim 10, wherein the plurality of components further comprise a disc metering assembly which is also assembled along a substantially vertical axis corresponding to a central axis through the plastic housing body and the disc metering assembly.

12. The method of claim 10, wherein the plurality of components further comprise a single-piece sealing member that is disposed in a bottom of the housing bottom over the inlet port and the outlet port.

13. The method of claim 10, wherein the metal in the metal housing bottom and the portions of tubing consists essentially of a lead-free material.

* * * * *